(12) United States Patent
Betsch et al.

(10) Patent No.: US 6,450,084 B1
(45) Date of Patent: Sep. 17, 2002

(54) PISTON WITH PISTON RING

(75) Inventors: Hans-Joachim Betsch, Kamen; Ewald May, Bonn, both of (DE)

(73) Assignees: Krupp Bilstein GmbH, Ennepetal; GKN Sinter Metals GmbH, Bonn, both of (DE)

( * ) Notice: Subject to any disclaimer, the term of this patent is extended or adjusted under 35 U.S.C. 154(b) by 127 days.

(21) Appl. No.: 09/647,605

(22) PCT Filed: Apr. 3, 1998

(86) PCT No.: PCT/SG98/00024

§ 371 (c)(1),
(2), (4) Date: Sep. 28, 2000

(87) PCT Pub. No.: WO00/22316

PCT Pub. Date: Apr. 20, 2000

(30) Foreign Application Priority Data

Oct. 9, 1998 (DE) .......................................... 198 45 610

(51) Int. Cl.[7] .................................................. F16F 9/32
(52) U.S. Cl. .......................................... 92/248; 92/257

(58) Field of Search .......................... 92/248, 249, 255, 92/257, 259

(56) References Cited

U.S. PATENT DOCUMENTS 244,292 A * 7/1881 Perkins ...................... 92/257 X
4,955,284 A * 9/1990 Faulkner ...................... 92/248

* cited by examiner

Primary Examiner—John E. Ryznic
(74) Attorney, Agent, or Firm—Max Fogiel

(57) ABSTRACT

A piston (1) with a piston ring (10) for a hydraulic or pneumatic unit fitted with a damping device and is mounted on a piston rod, dividing a cylinder (9) into two working areas and consisting of at least two parts (2, 9) that are adjacent to a surface (4) extending perpendicularly to the axis of symmetry (5). The piston ring (10) has an axial extension (14) that is several times greater than the thickness (15) of the wall of the ring and is disposed in an outer circumferential groove (6) that extends over both parts (2, 3). The invention provides a piston that prevents rumbles and is easy to produce, requiring only a few components.

4 Claims, 1 Drawing Sheet

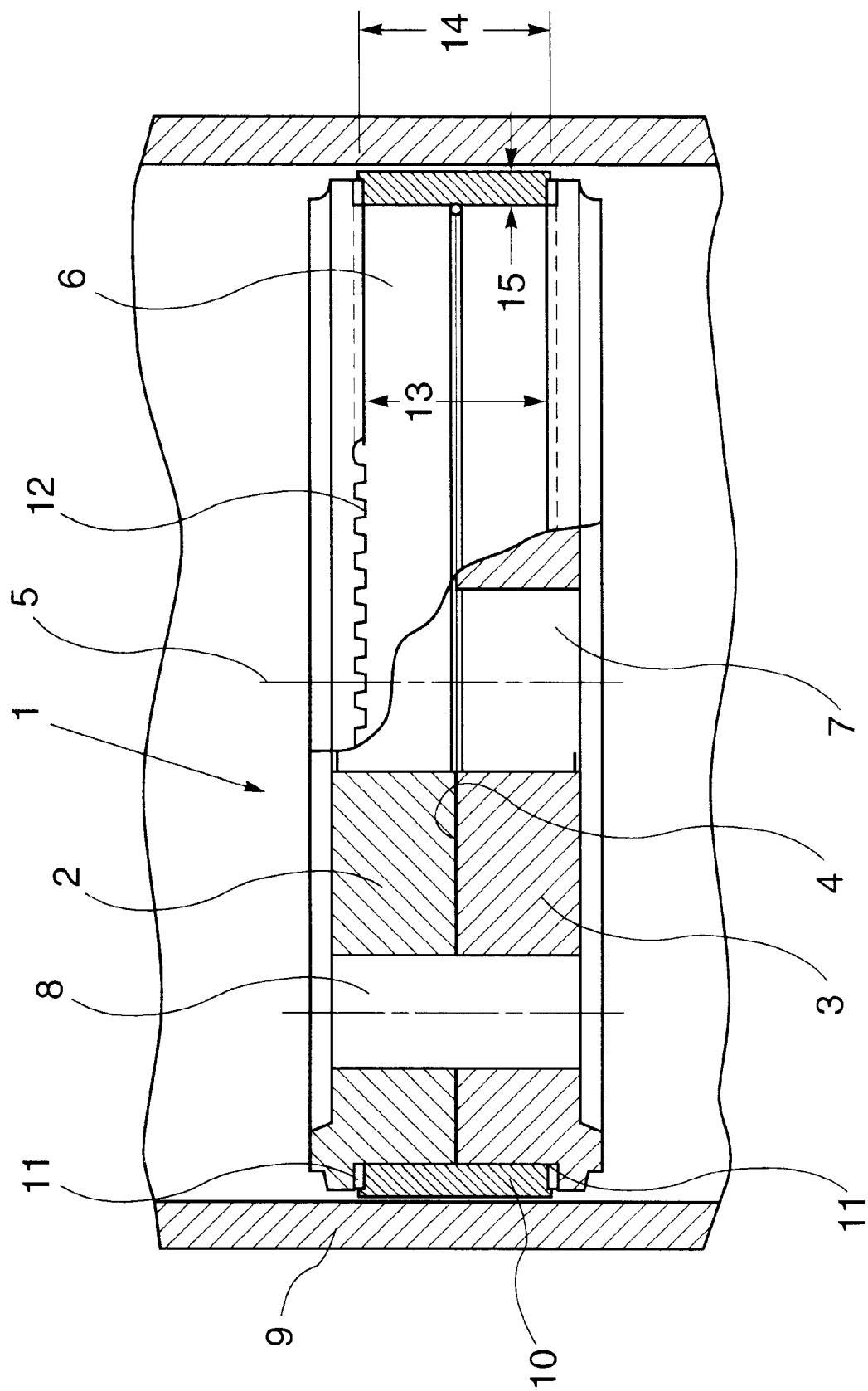

PISTON WITH PISTON RING

BACKGROUND OF THE INVENTION

The present invention concerns a piston and piston ring for a hydraulic or pneumatic mechanism and especially for a dashpot.

That friction between the piston and cylinder can be decreased by mounting a preferably plastic ring around the outer surface of the piston is known.

DE 3 701 757 A1 discloses such a piston and ring. The ring is accommodated in a groove that extends around the outer surface of the piston. The ring that characterizes this particular prior art is very thin-walled and is accordingly also referred to as "sheet". There are drawbacks to this system due to the need to maintain precise tolerances between the dimensions of the groove, the diameter of the cylinder, and the thickness of the sheet. These tolerances must allow the piston to travel in and out of the cylinder smoothly and can lead to displacement of the ring within the groove. The resulting rumbling noise can be heard inside the vehicle.

Tensioning the ring inside the groove axially or radially is known from DE9017933U1. The tensioning means, however, are very complicated and accordingly expensive.

SUMMARY OF THE INVENTION

The object of the present invention is to combine such a generic piston with a ring in such a way as to prevent rumbling in an embodiment that will be simple to produce and include few components.

The major advantages of the present invention are that the two-part piston and its associated ring are easy to manufacture and that the ring will be reliably tensioned to the piston without being essentially dependent on the tolerances of the components. Above all, no rumbling will be perceptible from inside the vehicle.

BRIEF DESCRIPTION OF THE DRAWING

One embodiment of the present invention will now be specified with reference to the accompanying drawing, wherein the single figure is a section through part of a piston with a ring mounted in a groove in its outer surface.

DESCRIPTION OF THE PREFERRED EMBODIMENTS

A piston 1 is composed of two essentially identical halves 2 and 3 that rest against each other by way of contact surfaces 4 across the axis 5 of symmetry, leaving a groove 6 in the outer surface of the piston between them. A bore 7 extends through the center of piston 1. A centered accommodation mounted on the end of an unillustrated piston rod normally extends through bore 7, securing the piston to the end of the rod. Fluid-conveying ports 8 that can be closed at one or both ends by valves control the flow of fluid through the dashpot and accordingly the device's performance.

Piston 1 is sealed and centered inside its associated cylinder 9 by a ring 10. Ring 10 can be intact or segmented and rests in groove 6.

The walls 11 of groove 6 are provided with elevations 12. The elevations 12 in the illustrated embodiment are trapezoidal in cross-section and extend radially inward. The distance 13 between each elevation 12 and its opposite is shorter than the axial extent 14 of ring 10. The ring 10 in the illustrated embodiment is plastic. Since its axial extent 14 is several times its thickness 15 the ring can be considered "sheet".

The axial extent 14 of the ring 10 in the illustrated example is dimensioned to ensure that the volume of the ring, which is forced forward by elevations 12 when halves 2 and 3 are joined, will be less than the volume of groove 6 not occupied between elevations 12 once the device has been assembled. The depth, the cross-section, and the distance between elevations 12 in conjunction with the dimensions of the excess mass of axial extent 14 in relation to the depth of penetration of elevations 12 into the ring can be established by one of skill in the art to ensure that all the axial tolerances of all the components of significance in this region can be compensated without severe jamming.

The design hereintofore specified will ensure a solid, secure, and accordingly low-friction connection between piston 1 and ring 10. This design, however, is also simple and will ensure that the operation of the shock absorber will not be detrimentally characterized by rumbling.

1. piston
2. half
3. half
4. contact surface
5. axis of symmetry
6. groove
7. bore
8. port
9. cylinder
10. ring
11. wall
12. elevation
13. distance
14. axial extent
15. Thickness

What is claimed is:

1. A piston and piston ring for a hydraulic or pneumatic mechanism especially for a dashpot, comprising a piston with a shock absorber is mounted on a piston rod; a cylinder separated into two chambers by said piston, said piston having at least two halves meeting a contact surface extending across an axis of symmetry; a plastic ring having an axial extent and a wall thickness, said axial extent being several times said wall thickness, said plastic ring resting in a groove extending around both halves; said groove having walls with elevations extending toward the groove, each elevation having an opposite, a distance between each elevation and said opposite being less than said axial extent of said ring.

2. A piston as defined in claim 1, wherein said elevations are wedge-shaped and extend radially.

3. A piston as defined in claim 1, wherein said elevations are trapezoidal in cross-section and extend radially.

4. A piston as defined in claim 1, wherein said ring has a first volume displaced by said elevations and said groove has a second volume not occupied between said elevations by said ring, said axial extent of said ring being dimensioned to ensure that said volume of the ring displaced by said elevations is less than said volume of said groove not occupied between said elevations by the ring.

* * * * *

UNITED STATES PATENT AND TRADEMARK OFFICE
CERTIFICATE OF CORRECTION

PATENT NO.      : 6,450,084 B1
DATED           : September 17, 2002
INVENTOR(S)     : Betsch et al.

Page 1 of 1

It is certified that error appears in the above-identified patent and that said Letters Patent is hereby corrected as shown below:

<u>Title page,</u>
Item [86], "PCT No.:" should read -- [86]  PCT NO.: PCT/EP99/06760
§ 371 (c)(1),
(2) , (4) Date: September 13, 1999 --

Signed and Sealed this

Fifteenth Day of April, 2003

JAMES E. ROGAN
*Director of the United States Patent and Trademark Office*